July 13, 1965 P. V. HODGE ETAL 3,194,075
APPARATUS FOR MEASUREMENT OF GRAVITY AT SEA
Filed Sept. 6, 1963 3 Sheets-Sheet 1

INVENTORS
David T. Barry
Paul V. Hodge

BY

ATTORNEY

July 13, 1965  P. V. HODGE ETAL  3,194,075
APPARATUS FOR MEASUREMENT OF GRAVITY AT SEA
Filed Sept. 6, 1963  3 Sheets-Sheet 3

INVENTORS
David T. Barry
Paul V. Hodge

BY *[signature]*

ATTORNEY

United States Patent Office 3,194,075
Patented July 13, 1965

3,194,075
APPARATUS FOR MEASUREMENT OF GRAVITY AT SEA
Paul V. Hodge and David T. Barry, Dallas, Tex., assignors to Texas Instruments Incorporated, Dallas, Tex., a corporation of Delaware
Filed Sept. 6, 1963, Ser. No. 307,261
6 Claims. (Cl. 73—382)

The present invention relates to the measurement of the force of gravity and more particularly to an apparatus for the continuous measurement of gravity over regions of the earth as the apparatus is moved over these regions. The invention is especially useful in the continuous measurement of gravity over regions of the earth which are submerged beneath water.

The discovery of the presence of anomalies in the gravitational field of the earth is one indication of the presence of oil or other valuable minerals. Also, many research groups are interested in discovering the presence of these anomalies to further their understanding of the earth's structure. Gravity surveys for the purpose of determining or discovering such anomalies have been conducted for many years, both over land and sea, but with certain difficulties being encountered in making surveys at sea.

Most gravity sensor will only respond to forces along a single sensitive axis. If the gravity meter is mounted with its sensitive axis in a vertical plane and mounted on solid ground, the instrument will read the force of gravity within the limits of the sensor in the absence of a seismic disturbance such as a volcano, earthquake or large explosion which would disturb the stability of the ground on which the meter is mounted. In the event, however, the gravity meter is mounted on a platform that is not stabilized by the earth itself, the sensor is subject to horizontal and vertical accelerations due to motion of the platform. These accelerations affect the gravity sensor in exactly the same way as do gravitational forces, and these horizontal and vertical acceleration effects must be subtracted or compensated for to provide an indication of absolute gravity.

Most gravimetric surveys at sea are conducted by carrying the gravity meter aboard ship and continuously plotting the forces indicated by the gravity meter as the ship traverses a desired course. However, the pitch and roll of the ship influenced by the wind, waves and ocean currents produce both horizontal and vertical accelerations of a magnitude much greater than the changes in the earth's gravitational field. In an effort to isolate the gravity sensing unit from these horizontal and vertical accelerations, extremely complex and expensive suspension systems have been devised. Resort has also been had to lowering the gravity sensing unit to the bottom of the ocean floor and making the actual measurement with the sensor resting there. However, this has not proved completely satisfactory in that it only permits isolated sampling of the gravity field and is much more time consuming, thereby greatly increasing the cost of the survey. Gravity meters have also been installed in submarines for purposes of reducing the magnitude of the accelerations to which the gravity sensor is subjected. Thus, it is known that even as little as 60 feet below the surface of the sea, the effects of wind and waves are reduced by a factor of about 4 as compared to these effects at the surface of the sea. Although these accelerations in a submarine are much less than normally encountered aboard a surface ship such that the suspension system is somewhat simplified as compared to surface ship systems, even a submarine is subjected to rather severe horizontal and vertical accelerations as it moves beneath the sea due to the fact that it is self-propelling and because of its general lack of hydrodynamic stability.

In accordance with the present invention, a gravity sensing unit is mounted in a submergible body or fish which is submerged and towed in a fluid beneath which the earth is situated, wherein the body maintains a condition of hydrodynamic stability as it is towed. For example, the body may be towed through the atmosphere above the earth's surface by an aircraft and cable arrangement, or may be submerged in water and towed by a surface vessel or submarine. The shape of the body is such that it is in a condition of true stability when it is towed; that is to say, the fluid flow past the body tends to maintain the body on a straight course. The body is streamlined in the general shape of a projectile to accomplish this, and suitable fins are provided on the rearward end to prevent any rotation of the body about its long axis. The overall shape of the body is such as to reduce to a minimum any turbulence as the fluid passes over it. Any non-uniform motions or accelerations of the towing aircraft or vessel are greatly reduced or attenuated by the towing cable, such that the towed body containing the gravity meter experiences little, if any, of these effects. The depth at which the submergible body passes through the water is a function of its distance from and the speed of the towing vessel, in addition to other factors to be discussed below. Since the speed of the towing vessel can be maintained substantially constant, the magnitudes of the accelerations to which the towed body is subjected are further reduced.

The gravity sensor is mounted within the towed body at or near its center of moment to reduce the effect on the sensor of any accelerations to which the body may be subjected, and the means for so mounting are such as to maintain the gravity sensor substantially vertical as the body traverses its course. A gimbal mounting is preferred because of its simplicity, reliability and low cost, although other or more complex mounting systems may be utilized.

In using the present invention, it is practical to tow at widely spaced intervals a plurality of the towed bodies each containing a gravity sensing device in a manner similar to that utilized in seismic surveys. It thereby becomes feasible to use various types of filtering and signal correlation techniques developed in the seismic industry for enhancing the gravity indications and for reducing or eliminating the portion of the indications or signals attributable to undesired vertical and horizontal accelerations.

Many other objects and advantages of the invention will become apparent to those skilled in the art from the following detailed description of a perferred embodiment of the same when taken in conjunction with the appended claims and the attached drawings wherein like reference numerals refer to like parts throughout the several figures, and in which:

Figures 1, 4:
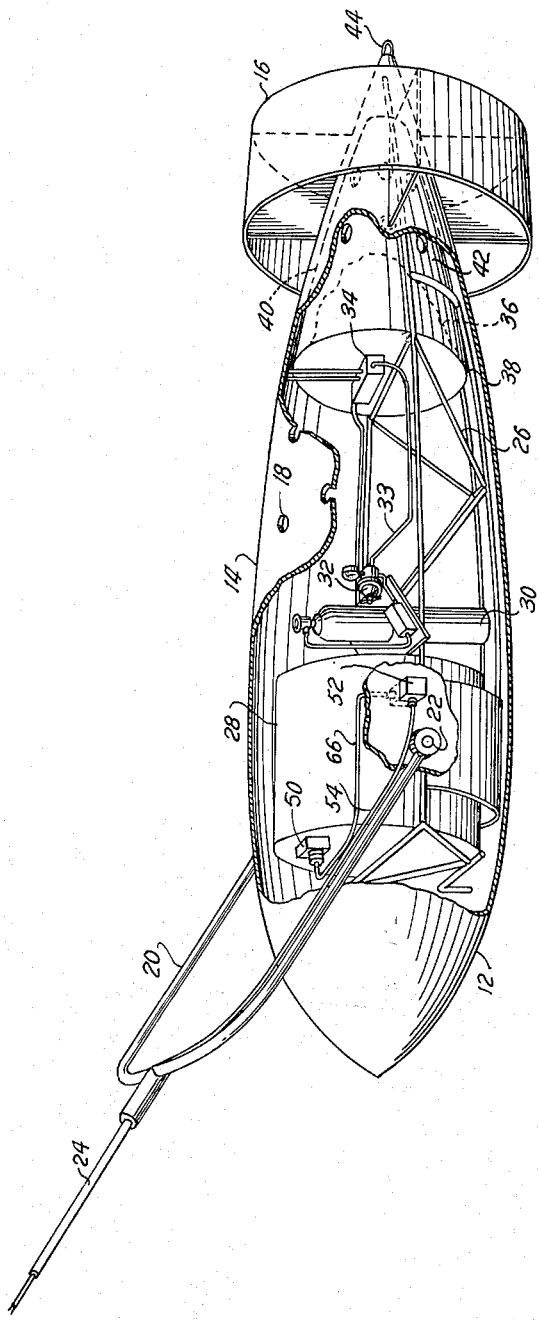
FIGURE 1 is a cut away perspective view illustrating the preferred embodiment of the dynamically stabilized body within which the gravity sensitive system is mounted.
Figure 3:
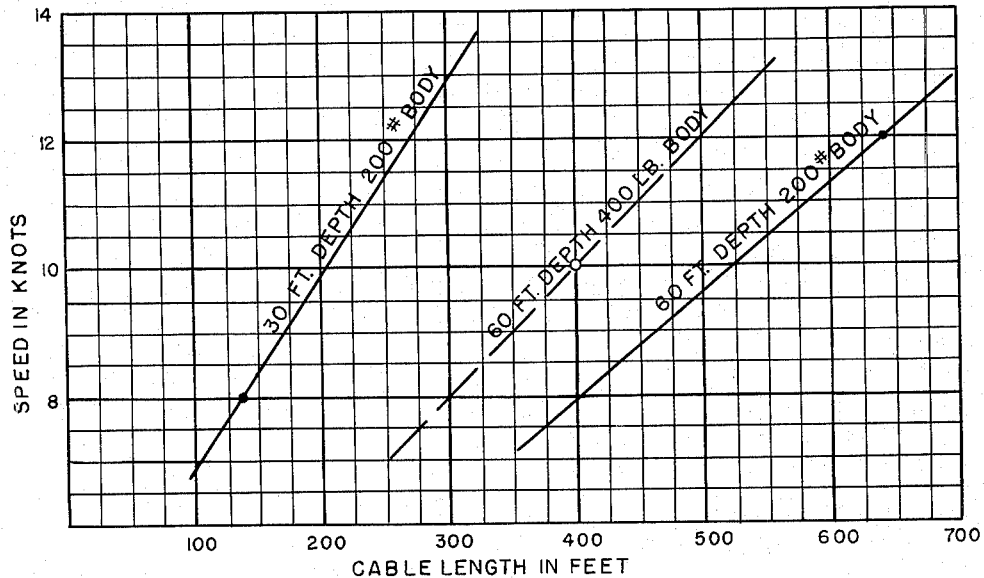
Figure 5:
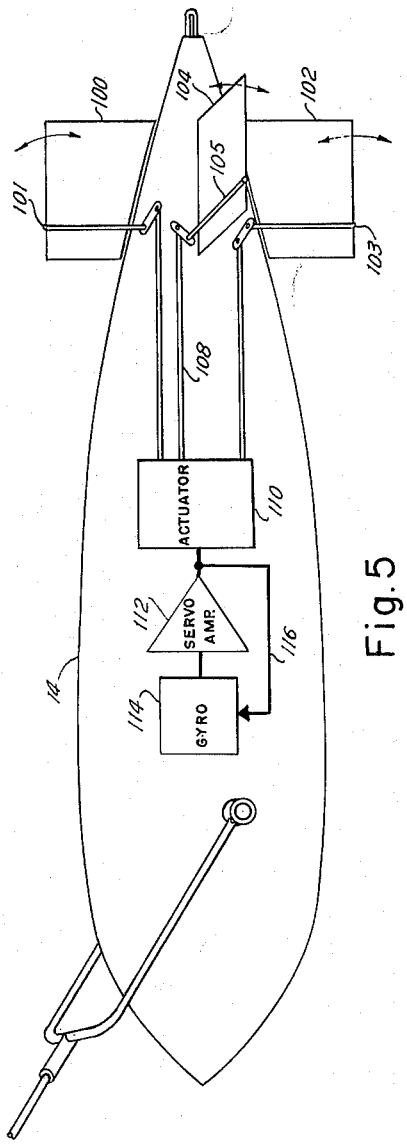
Figure 6:
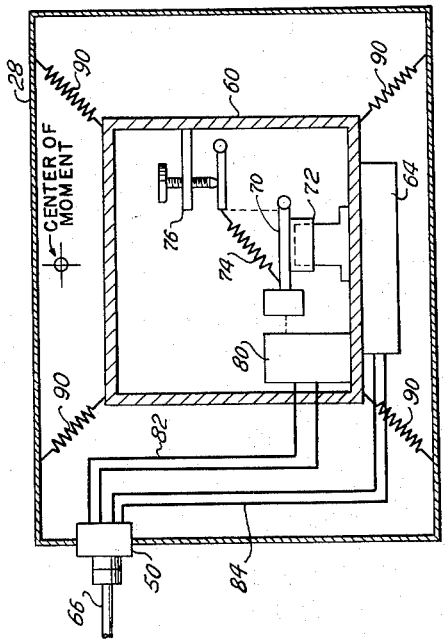

FIGURE 3 graphically illustrates the depth at which the towed body travels through water as a function of both the speed of the towing vessel and the length of the cable connecting the towed body and the towing vessel;

FIGURE 4 is a side elevation view illustrating a surface vessel towing a plurality of the dynamically stabilized bodies in a submerged condition;

FIGURE 5 shows the body of FIGURE 1 including a gyro-servomechanism system for further stabilizing the body; and FIGURE 6 shows additional means for mounting the gravity sensor within the body.

Although the preferred embodiment of the invention will be described with reference to a body adapted to be submerged and towed in water, it is to be understood that essentially the sample principles will apply when towing a body in the atmosphere by an aircraft.

Referring now to FIGURE 1, the body includes a hydrodynamically stabilized main body portion 14 and stabilizing fins 16. The body portion 14 may be made of any suitable material, such as molded Fiberglas, and is formed with a plurality of openings 18 which permit water to fill the body. The stabilizing fins may be of many different configurations, whereas the type shown is by way of example only. A yoke 20 is pivotably attached to the body at points 22 with a cable 24 attached thereto and extending between the yoke and the towing ship. A supporting frame 26 which is suitably of tubular aluminum is provided within the body for supporting an instrument package 28 which contains the gravity sensitive element. The frame 26 also supports flotation equipment which comprises a cylinder of compressed air 30 which is connected through a high pressure regulator 32, appropriate air lines 33 and a low pressure regulator 34 to an inflatable member 36 (shown in phantom), the latter being connected to a bulkhead 38. A generally conical shaped ballast tank member 40 is formed with holes 42 therein and extends rearward from the bulkhead 38 as shown. The holes 42 likewise allow the ballast tank to become filled with water when the inflatable member is deflated. When it is desired to surface the fish, a valve is actuated to fill the inflatable member with air from the tank. A tail loop 44 is provided for lifting the fish from the water.

It will be noted that the shape of the body is streamlined with a tapering tail section so that as it moves through the water, very little, if any, turbulence is encountered about the body to cause instability. Thus, as the body passes through the water to create thereabout a high velocity flow of water relative to the stationary or low velocity water generally surrounding it, the higher pressure of the latter maintains the body in the high velocity stream, much like a ping-pong ball will become stabilized in a high velocity vertical air stream. The vertical and horizontal fins prevent the body from rotating about its long axis as it moves along its course. Thus, the shape of the body cooperates with the fluid through which it moves to stabilize the body on a straight-line course with a minimum of roll, pitch and yaw, which is referred to as hydrodynamic stability.

The instrument package 28 is provided with a first junction box 50 electrically connected to a second junction box 52 which, in turn, is electrically connected to recording means on board the towing vessel by means of cable 54 and coaxial cable 24, so that gravity indications can be observed on board the towing vessel in the form of electrical signals or the like.

Figure 2:
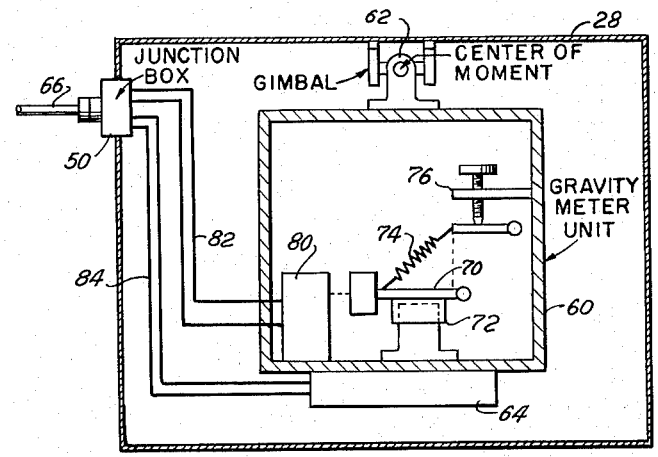
FIGURE 2 is a view, partly in cross section, diagrammatically illustrating the manner in which the gravity sensor may be mounted within the body of FIGURE 1.

Turning now to FIGURE 2, the instrument package 28 is hermetically sealed and includes the junction box 50 for permitting electrical access through the walls of the package. A gravity meter unit 60 is mounted within the instrument package by gimbals 62. The gimbals are preferably located at the center of moment of the fish which is the intersection of the roll and pitch axes of the fish 12 to minimize the effects of any motion of the fish. By way of illustration, the gravity meter unit 60 is preferably of the La Coste-Romberg Gravity Meter Company type, such as described in Patent Nos. 2,293,437 and 2,377,889, although any other suitable meter may be used. Only those components of the gravity meter deemed necessary for purposes of illustration are shown diagrammatically, and include a pivotal beam 70, a damper 72, a tension spring 74 and an adjustment member 76. An adequate description of the gravity meter is given in the above noted patent and will not be elaborated on here. An optical system 80, such as described in the patent, is used to determine the beam portion, and the electrical output thereof indicating this position is transmitted back to the vessel via electrical connections 82 from the output of the optical system to the junction box 50 and ultimately along cable 24. The electrical continuity is from junction box 50 through cable 66 to junction box 52, which connects to cable 54 and transmits the electrical information to the surface vessel through cable 24.

The gimbals 62 are as frictionless as possible to insure that the gravity meter unit 60 will remain at all times with its sensitive axis in the vertical plane. However, any horizontal accelerations which are present will cause the meter 60 to swing. As the meter swings, the sensitive axis of the meter will be aligned in the direction of the vector sum of the force of gravity and the accelerating force, and the meter will measure this vector sum. It is readily apparent that the vector sum or apparent gravity will be greater than the actual gravity, because of the vector addition of these two forces at right angles. However, by utilizing a hydrodynamically stabilized fish or container such as shown which is towed through the water at a substantially constant speed, these horizontal accelerations may be reduced to the point that they have a negligible effect upon the accuracy of the meter, permitting the size of the instrument package and hence the size of the hydrodynamically stabilized fish to be small. That is, the streamlined and symmetrical configuration of the fish as shown will tend to traverse a straight line path.

Under more adverse conditions where underwater forces transmitted to the fish from the vessel by the towing cable cause, to some extent, instability, it is desirable to provide some means to determine the angle between the force of gravity and the accelerating force, so that the true force of gravity can be computed. This is accomplished, for example, by attaching to the gimballed housing containing the gravity meter a pair of long-period horizontal pendulums mounted at 90 degrees with respect to each other, and each being mounted for pendulum movement in a horizontal plane. The position of the pendulums is a measure of the angle in the particular direction of the pendulum movement, and this position is also detected by an optical system (not shown). Knowledge of both pendulum positions gives all information necessary for computing the angle from the vertical at which the gimballed housing 60 is oriented An electrical output from the pendulums is transmitted to the vessel via electrical connections 84 coupled to the junction box 50, and ultimately along cable 24. The long-period pendulums are preferably of the type disclosed in Patent No. 2,964,948, but can be of any other suitable type. Alternately, other means for measuring the angle are suitable for this purpose.

As the hydrodynamically stabilized body is towed through the water, its depth will be a function of the buoyancy of the fish or body, the speed at which it is towed, the cable length between the body and the towing ship, and certain physical coefficients of the cable and the hydrodynamically stabilized body. Typical curves illustrating this relationship are shown in FIGURE 3. Thus, it is seen that for a constant speed, the running depth of the hydrodynamically stabilized body will increase as the length of the towing cable is increased. Similarly, the increase in the negative buoyancy of the hydrodynamically stabilized body will cause an increase in the running depth of the body. The depth to which the body is submerged depends primarily on the lifting force exerted on the towing cable and the buoyancy of the body, however. Although these relationships can be calculated with a great deal of accuracy from presently available information, it is desirable that a depth measuring instrument be incorporated into the instrument package for purposes of indicating this depth, as most gravity measurements are related to the gravity at sea level and difference in elevation of only a few feet will appreciably affect the data obtained. Depth measuring instruments are well known and can be mounted on the gimballed container 60 to indicate the exact horizontal depth of the weight on the weight arm 70, with electrical connections through the cable 24.

As mentioned previously, one of the principal advantages of the present invention is that a plurality of hydrodynamically stabilized bodies containing the gravity meter units can be towed in any desired array. A typical array is shown in FIGURE 4, wherein three of the bodies are towed in a straight line. Any signal noise produced by undesired horizontal or vertical accelerations will be random in character, whereas each of the instruments will produce the same output responsive to passing over identical physical points on the earth's surface. By shifting the outputs received from the individual gravity instruments in accordance with the velocity of the towing ship using well known principles developed in the magnetometer and seismic arts, it is possible to enhance the portion of the signal attributable to the force of gravity to a great extent and reduce or eliminate the portion of the signals attributable to horizontal or vertical accelerations produced by movement of the hydrodynamically stabilized body.

It should be pointed out that compensations for vertical accelerations of the fish due to the forces coupled from the surface vessel by the cable can easily be made aboard the surface vessel. For example, the effects of these accelerations are filtered or averaged out by means of low-pass filters.

Any suitable computer, digital or analogue, can be used according to well known techniques in this art for computations and calculations of the true force of gravity as evidenced by the electrical information transmitted along the cable 24.

In order to further stabilize the body, if necessary, a gyro-servomechanism system is used as shown in FIGURE 5, where this system is substantially equivalent to that used in torpedoes, guided missiles and the like. Instead of the fins being fixed in a single position, the vertical fins designated at 100 and 102 are fixed to pivots 101 and 103, respectively. Similarly, horizontal fin 104 (the horizontal fin on the other side not being shown) is fixed to pivot 105. Each of the pivots is coupled to a linkage arm 108, respectively, which, in turn, is coupled to an actuator 110. A gyro 114 or other suitable position sensor is electrically connected to a servo-amplifier 112, which amplifier is connected to the actuator. The gyro is located in the body other than at its center of moment, and as the body deviates from its straight-line course, the gyro generates an output error signal which is fed to the input of the amplifier. The amplifier and servomechanism 112 produces a signal which causes the actuator to turn either the vertical fins or the horizontal fins, or both, to correct for the deviation and bring the body back on its true course. The output of the servomechanism is fed back into the gyro by connection 116 to offset the error signal so that the servomechanism does not continue to cause the actuator to turn the fins. As the body once again attains a straight-line course, the fins are returned to their normal positions by the same means. The servo system as described is commonly used for the purpose described and, therefore, details of this system will not be given here.

There is illustrated in FIGURE 6 means for supporting the gravity meter other than gimbals as previously described, where only the instrument package 28 and the gravity meter with its supporting means are shown. This package is identical to that shown in FIGURE 2 except springs 90 support the gravity meter and its housing 60 rather than gimbals. A separate spring 90 is attached to each of the eight corners of the gravity meter (only four springs being shown), the springs having their other ends attached to the interior of the package 28 as shown. The package is located in the body in the same position as before; likewise, the gravity meter is positioned within the package 28 at the same position, with the center of moment being located above the meter (as shown) the same as if gimbals were used to support the meter at the center of moment. As the body deviates from its true course, the gravity meter swings as if it was supported by a pivot at the center of moment. Thus, it will be seen that the system is essentially equivalent to the meter supported by gimbals.

Insofar as the invention has been described with reference to a preferred embodiment thereof, certain modifications will become apparent to those skilled in the art, and such alterations and modifications are deemed to fall within the true scope of the invention as defined by the appended claims.

What is claimed is:

1. An apparatus for measuring the force of gravity over a region of the earth which is submerged beneath water, comprising:
    (a) a body adapted to be submerged and towed in water in a condition of hydrodynamic stability;
    (b) a gravity sensing device having a gravity sensitive element; and
    (c) supporting means for supporting said device within said body,
    (d) said supporting means including gimbals for rotation of said device in each of two mutually perpendicular vertical planes, and said supporting means being located within said body near the center of moment thereof to prevent any substantial rotation of said gravity sensitive element about said center of moment when said body rotates thereabout.

2. Apparatus according to claim 1 wherein said body is substantially symmetrical about an axis connecting its forward and rearward ends.

3. Apparatus according to claim 1 including additional sensing means located within said body for sensing any deviation of said body from a straight-line course, and responsive means responsive to said sensing means for restoring said body to a straight-line course.

4. An apparatus for measuring the force of gravity over a region of the earth which is submerged beneath water, comprising:
    (a) a body adapted to be submerged and towed in water in a condition of hydrodynamic stability;
    (b) a gravity sensing device having a gravity sensitive element;
    (c) means for supporting said device within said body,
    (d) said means including gimbals for rotation of said device in each of two mutually perpendicular vertical planes, and said means being located within said body near the center of moment thereof and tending to prevent any substantial rotation of said gravity sensitive element about said center of moment when said body rotates thereabout; and
    (e) means for sensing any horizontal accelerating force acting on said gravity sensitive element when said gravity sensitive element rotates about said center of moment.

5. Apparatus for measuring the force of gravity over a region of the earth which is submerged beneath water, comprising:
    (a) a body adapted to be submerged and towed in water in a condition of hydrodynamic stability;
    (b) a gravity sensing device having a gravity sensitive element;
    (c) supporting means for supporting said device within said body;
    (d) said supporting means including gimbals for rotation of said device in each of two mutually perpendicular vertical planes, and said supporting means being located within said body near the center of moment thereof to prevent any substantial rotation of said gravity sensitive element about said center of moment when said body rotates thereabout; and (e) towing means for towing said body behind a vessel in spaced relation therefrom.

6. Apparatus according to claim 5 wherein said body includes ballast means for surfacing said body from a submerged condition.

References Cited by the Examiner
UNITED STATES PATENTS

| | | | |
|---|---|---|---|
| 2,468,021 | 4/49 | Black | 73—170 |
| 2,681,568 | 6/54 | Cloud | 73—184 X |
| 2,720,047 | 10/55 | Isaacs | 73—185 X |
| 3,027,762 | 4/62 | Tobin | 73—504 X |
| 3,033,037 | 5/62 | Emmerich | 73—382 |

RICHARD C. QUEISSER, *Primary Examiner.*